United States Patent [19]
Williams

[11] Patent Number: 5,963,742
[45] Date of Patent: Oct. 5, 1999

[54] USING SPECULATIVE PARSING TO PROCESS COMPLEX INPUT DATA

[75] Inventor: Gerald S. Williams, Macungie, Pa.

[73] Assignee: Lucent Technologies, Inc., Murray Hill, N.J.

[21] Appl. No.: 08/925,564

[22] Filed: Sep. 8, 1997

[51] Int. Cl.$^6$ .................................................. G06F 9/45
[52] U.S. Cl. ................................ 395/708; 704/9; 707/1
[58] Field of Search ............................. 395/708; 704/9; 707/1

[56] References Cited

U.S. PATENT DOCUMENTS

| 5,251,131 | 10/1993 | Masuda et al. | 364/419.08 |
| 5,276,880 | 1/1994 | Platoff et al. | 395/700 |
| 5,418,717 | 5/1995 | Su et al. | 364/419.08 |
| 5,655,122 | 8/1997 | Wu | 395/705 |

OTHER PUBLICATIONS

Charniak, Statistical Techniques for Natural Language Parsing, Al Magazine, Winter 97, pp. 33–43.
Cardie Empirical Methods in Information Extraction, Al Magazine, Winter 97, pp. 65–79.
Brill and Mooney, An Overview of Empirical Natural Language Processing, Al Magazine, Winter 97, pp. 13–24.
Sperber and Thiemann, The Essence of LR Parsing, 1995 ACM Journal, pp. 146–155.

*Primary Examiner*—Tariq R. Hafiz
*Assistant Examiner*—Antony Nguyen-Ba

[57] ABSTRACT

A parser includes a plurality of subparsers, a main parser unit, and a selector. Each of the subparsers attempts to interpret a stream of tokens corresponding to a statement in a respectively different way. In addition, each subparser returns a speculative result and a respective confidence level. The main parser unit receives the stream of tokens, identifies that the stream of tokens make up a statement and invokes at least a few of the subparsers. The selector selects one speculative result based upon the confidence level returned by the subparsers which are invoked by the main parser unit.

16 Claims, 7 Drawing Sheets

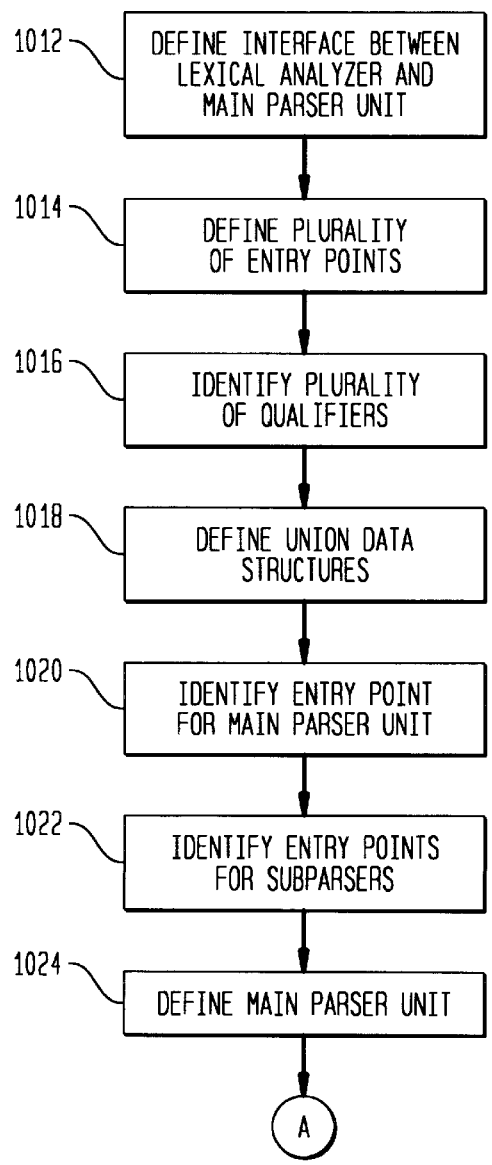

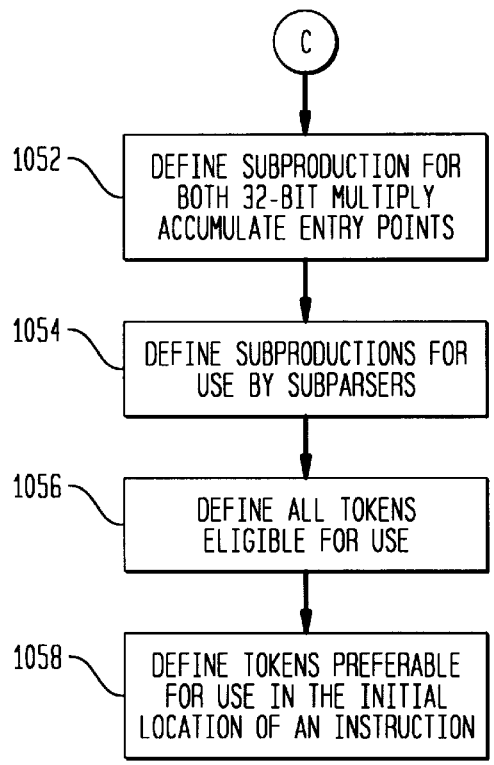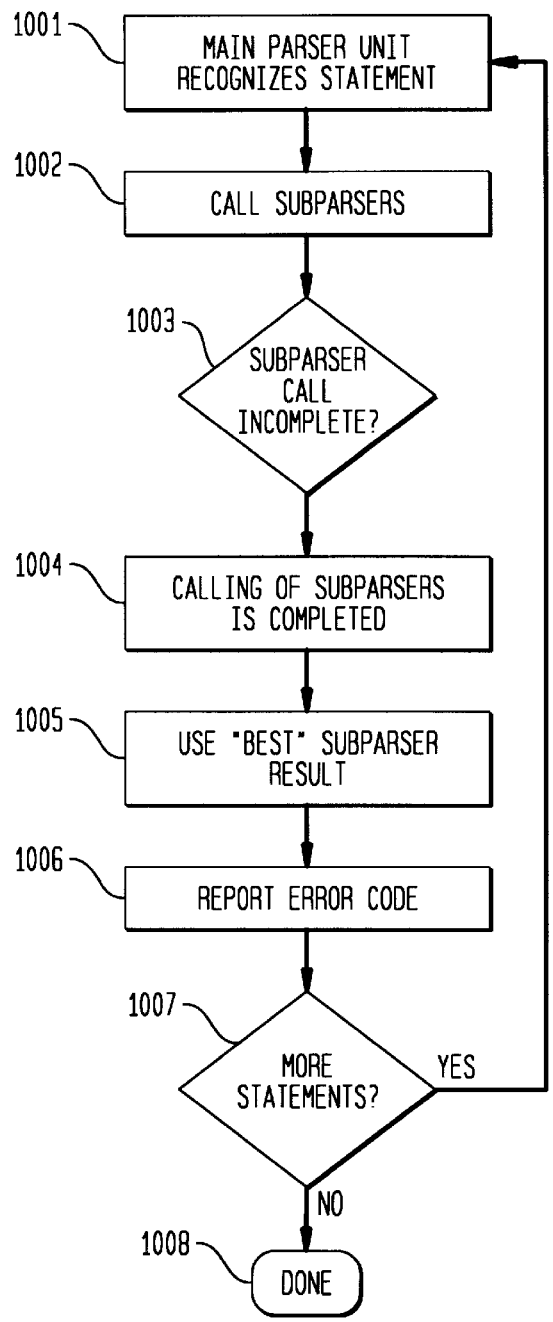

USING SPECULATIVE PARSING TO PROCESS COMPLEX INPUT DATA

FIELD OF THE INVENTION

The present invention relates to compilers and in particular to parsers. Specifically, an apparatus and method are presented for parsing source code using multiple parsers.

BACKGROUND OF THE INVENTION

Compilers are used to convert one language (e.g., a programming language) into another language. The language being converted, called the source language, may be readily understood by one skilled in the computer programming art. A source program (written in the source language) may be translated into a target program (written in the target language) so that it may be executed on a computer.

Each programming language uses its own syntax and semantics. During the compiling process, the syntax and semantics of programs are verified. Syntax is the structure and specification of each language according to rules established for each language. These rules are referred to as the grammar. The semantics of each language is the meaning conveyed by and associated with the syntax of that language.

Compilers are typically constructed using two main components, namely, a lexical analyzer and a parser. The lexical analyzer reads the source statements and separates each word, symbol or number from the source statement into a "token". Each token is given a symbolic reference, often a number, and this symbolic reference is passed to the parser section of the compiler. The parser analyzes a stream of program expressions to determine whether or not the program expressions are syntactically correct. Once it is determined that a stream of expressions is syntactically correct, the stream of expressions can be compiled into executable modules.

In parsing a computer program input stream, the lexical analyzer uses a set of rules to group the predetermined characters into tokens. The lexical analyzer can recognize different types of tokens, such as identifiers, decimal constants, floating point constants, etc.

The parser imposes a structure on the sequence of tokens using a set of rules appropriate for the language. Such rules are referred to as a context-free grammar. These rules may be specified in, what is known as, Backus Naur form (for example).

Each grammar rule may be referred to as "production". Tokens are detected and passed to the parser program. Each string in the input stream that is parsed as having correct syntax is accepted. For example, the string 5*2+3 is accepted while the string 9++8 is rejected because it is syntactically incorrect.

A left to right, right most derivation (LR) parser accepts a subset of a context-free grammar. Each LR parser has an input, a push down stack, an output, a driver program and a parsing table. The parsing table is created from the grammar of the language to be parsed. Thus, the parsing table is unique to each language and its grammar. The driver program reads tokens one at time from the input stream. Based upon the information in the parsing table that corresponds to the token being analyzed, and based upon the current program state, the driver program shifts input tokens into the stack, reduces it by one of the productions, accepts a string of such tokens, or rejects the string of such tokens as being syntactically incorrect. Reduction is defined as the replacement of the right hand side of a production with the left hand side.

Each LR parser, for example, consists of a known modified finite automation with an attached push-down stack. At each discrete instance during a parsing operation, parser control resides in one of the parser's machine states. The parser looks ahead in the input stream for a subsequent token.

Reductions, as mentioned above, consist of a production number P and a collection of terminal symbols R, taken as a pair, and are always considered first in each state of the parser. If look ahead symbol L is in set R for production P, then the reduction is performed. As output of the production, the number P is given to a semantic synthesizer. Then, as many states as there are symbols on the right hand side of production P are popped off the stack. The non-terminal on the left hand side of the production P is put in place for the next look ahead. The state exposed at the top of the push down stack takes control of the parser action.

In some situations, the input stream may include statements which are either similar in appearance or complex. An example of a complex statement (using, for example, AT&T DSP1616 programming language) is:

$$a0=a0+p\ p=x*y\ y=*r0++\ x=*pt++$$

An example of a statement which is similar to the statement above is:

$$a0=a0-p\ p=x*y\ y=*r0++\ x=*pt++$$

In such cases, a single parser may have difficulty with interpretation of the statement, especially if additional productions are used to parse individual subparts of that statement.

Many programs that attempt to interpret natural languages (e.g., English) use a technique called speculative processing. When speculative processing is used in this way, the parser builds data structures such as "parse trees" (or "abstract syntax trees") in memory. These are then speculatively reduced in an attempt to match known patterns and determine their form and meaning. This technique is more clearly described in Aho, A., et al., *Compilers, Principles, Techniques, and Tools*, Addison-Wesley, 1986, page 49 et seq.

SUMMARY OF THE INVENTION

A parser includes a plurality of subparsers, a main parser unit, and a selector. Each of the subparsers attempts to interpret a stream of tokens corresponding to a statement in a respectively different way. In addition, each subparser returns a speculative result and a respective confidence level. The main parser unit receives the stream of tokens, identifies that the stream of tokens make up a statement and invokes at least a few of the subparsers. The selector selects one speculative result based upon the confidence level returned by the subparsers which are invoked by the main parser unit.

BRIEF DESCRIPTION OF THE DRAWINGS

FIG. 7 is a table, in accordance with a further exemplary embodiment of the present invention, which is useful for re-entrant parsing.

FIGS. 8(a), 8(b), 8(c), 8(d) and 8(e) are flowchart diagrams which illustrates the operation of an exemplary embodiment of the present invention.

DETAILED DESCRIPTION OF THE INVENTION

Figure 1:
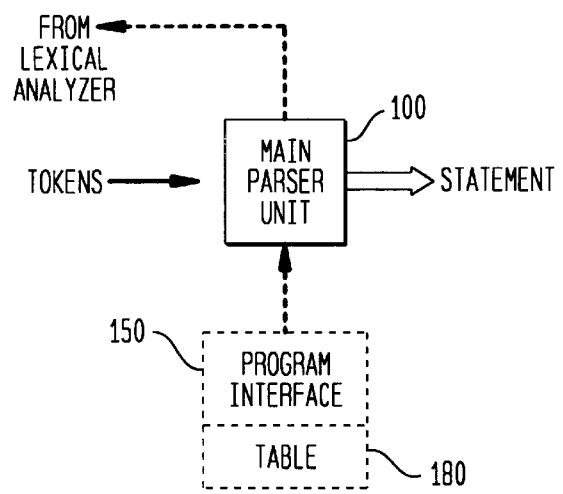
FIG. 1 is a block diagram which illustrates the receipt of tokens by the main parser unit in accordance with an exemplary embodiment of the present invention.

In FIG. 1, a first exemplary embodiment of the present invention is illustrated. As shown in FIG. 1, main parser unit 100 is included. A lexical analyzer (not shown), receives program source code which has been written in a source language. The lexical analyzer converts the program source code into tokens. The conversion of a source code program into tokens is well known to one of ordinary skill in the art and is described, for example, in Aho, A., et al., *Compilers, Principles, Techniques, and Tools*, Addison-Wesley Publishing Company, 1986, pp. 83–158, which is hereby incorporated by reference.

Main parser unit 100 receives tokens and determines when it has received all of the tokens which comprise a single statement. This can be done in numerous ways, and, again is known to one of ordinary skill in the art. For example, if PASCAL or C programming language source code is being compiled, main parser unit 100 may recognize that it has received a complete statement from the lexical analyzer when main parser unit 100 detects the token corresponding to a semicolon (";"). This is because the grammar of these languages is such that a semicolon indicates the end of a statement. In other programming languages, the end of a complete statement may be indicated by the start of a new line.

Figure 2:
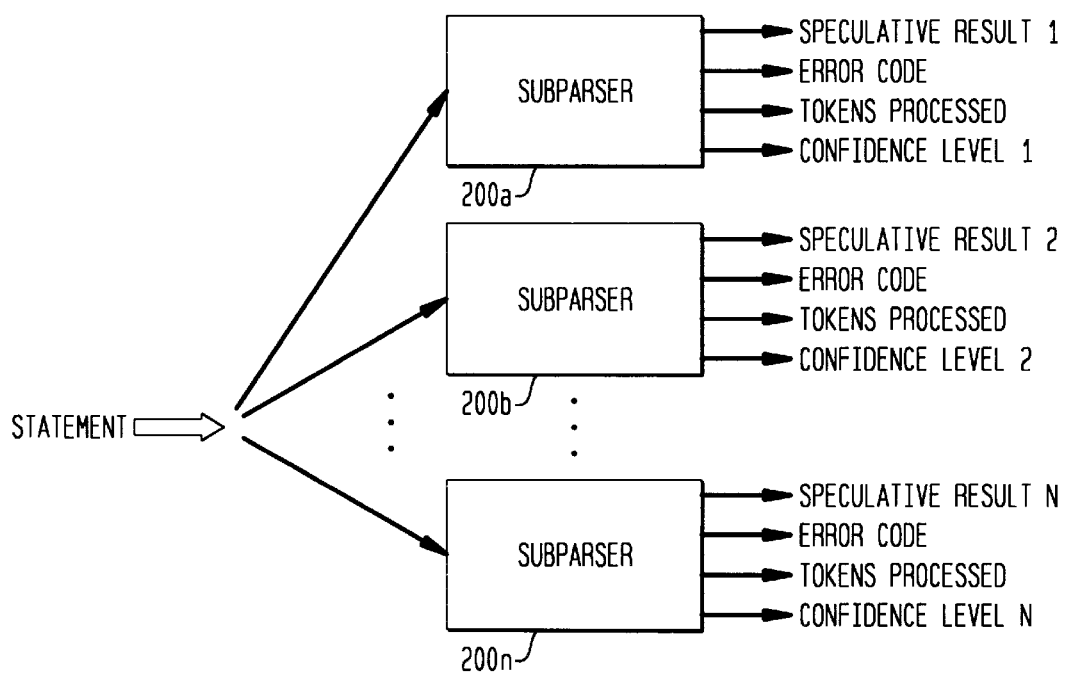
FIG. 2 is a block diagram which illustrates the operation of multiple subparsers in accordance with an exemplary embodiment of the present invention.

Main parser unit 100 is coupled to a plurality of subparsers 200a–200n which are shown in FIG. 2. Thus, when main parser unit 100 recognizes that it has received all of the tokens which correspond to a statement, main parser unit 100 can transfer all of these tokens to subparsers 200a–200n illustrated in FIG. 2.

Each subparser 200a–200n shown in FIG. 2 implements a different parsing algorithm. Thus, for example, each subparser may include a different parsing table. Each subparser attempts to reduce a received statement using its respective parsing table. Thus, each subparser attempts to build a parsing tree in accordance with its respective parsing table. The parsing tree which each subparser builds corresponds to a speculative result. Thus, if the subparser includes a parsing table which enables it to parse the statement it has received correctly, then the speculative result generated by that subparser corresponds to a correct parsing tree for the parsed statement. A correct parsing tree is the correct reduction of a statement by a subparser. Conversely, if the subparser includes a parsing table which is not correct for the statement being parsed, the subparser is unable to generate a correct and complete parsing tree. A parsing tree generated by a subparser with a parsing table which is not appropriate for the input statement is erroneous. Such a subparser, however, is able to produce at least a portion of a parsing tree. This parsing tree portion corresponds to that subparser's speculative result. That speculative result, however, is erroneous.

Each subparser generates other output data in addition to its respective speculative result. For example, the subparser may encounter an error as it attempts to parse the input statement. The parser can than generate a numeric error code which corresponds to the type of error detected. Such error identification is well known in the art. Further exemplary error reporting, in accordance with a further exemplary embodiment of the present invention, is illustrated in FIG. 7 and is described in more detail below. Each subparser may also be capable of outputting a data value which indicates the number of tokens which have been processed by the respective subparser before the error was detected. This information may be useful for displaying the source code line in which the error is contained and for indicating to the programmer where the parsing error (as best understood by the parser) has occurred.

Another value which may be generated by each subparser is a confidence level value. The confidence level value indicates whether parsing of the statement by the subparser has been completely successful, partially successful, or not successful at all. A numeric value may be used to indicate how successful the parsing was. In an exemplary embodiment of the present invention, different errors may result in varying amounts of reduction to the total confidence level generated by each subparser. Thus, if the subparser detects an error which is extremely critical, this may result in a significant reduction to the total confidence level value generated by the subparser. Conversely, if an error is detected which is rather non-critical, this may result in only a minor reduction to the total confidence level generated by the subparser. An example of a relatively minor error is the use of an unsigned numeric constant when a signed numeric constant is called for. An example of a relatively critical error may be the illegal use of a particular register (e.g. multiplication with a register that is dedicated to pointer operations only).

As previously stated, the main parser unit shown in FIG. 1 can potentially transmit the statement to any of the subparsers shown in FIG. 2. Thus, in one exemplary embodiment of the present invention, the main parser unit transmits the statement to all subparsers available. The transmission of the statement to all of the subparsers and/or the parsing of the received statement by each of the subparsers may be performed one at a time, concurrently, or some combination thereof.

As each subparser begins to parse the statement it has received, each subparser attempts to reduce the statement using its respective parsing table. Each subparser then generates a speculative result corresponding to the parsing tree which it has been able to generate from the statement using the subparser's respective parsing table. If the subparser has detected any errors in the statement, an appropriate error code is output. Also, if the subparser has detected an error in the statement, the subparser outputs a value which indicates the number of tokens which were processed before the error was detected. Also, the subparser generates a confidence level value which indicates whether the speculative result which is produced indeed represents a correct parsing tree for the parsed statement.

There are numerous factors affecting the confidence level. For illustrative purposes only, only a few examples will be presented here. As one example, there may be resource conflicts due to the use of too many registers (or, too many accumulators) for one instruction. As another example, there may be situations where the usage of an instruction is illegal. For example, the use of a particular looping construct (e.g. a DO loop) within another such construct (e.g., another DO loop) may be an illegal usage. In another situation, the use of a numeric constant (as opposed to a label) in a branch instruction may be improper. This is particularly applicable in situations where the branch should be made relative to the current program counter value, and not based upon a constant (non changing) value. In other situations, instructions desirably require coding according to pre-established rules. Thus, the encoding of certain instructions may be performed improperly. This also results in a decrease in the confidence level of the parse. In another exemplary situation, there is simply no coding which exists for a particular constant value. For example, certain numeric values may not be defined. Thus, to try to encode an undefined value results in a decreased confidence level. Various types of errors result in varying amounts of diminishment to the confidence level. In the aforementioned example, the results may be completely invalid, in which case the confidence level would be very low. Another error may be caused by an instruction which overwrites a previously written value which would result in the previously stored information being lost. Another undesirable situation is where an instruction is trying to write two different values to a single memory (or register) location. In another example, a reference to a register in a particular instruction cannot be encoded because of encoding restrictions in the instruction. For example, the restriction may require the writing to occur to an even or odd register. That instruction requirement may not be satisfied. There are other undesirable situations where the source register and the destination register should not be identical. For example, there may be situations where it is undesirable for the source register to copy a data value into itself.

In another situation, a particular constant in the program code may not appropriately fit into the declared logical storage medium which is to receive that value. In that situation, size is of particular concern. In this situation, the subparser attempts to choose as the object code an instruction which results in the largest data storage available for that particular type of instruction. In an exemplary embodiment of the present invention, the information given by the subparser may be used to choose the most desirable size of the data storage medium which is to receive the source value. Put another way, each subparser may only be able to return a single encoding for a particular store instruction. This encoding is returned to the main parser with a respective confidence level generated by each subparser. The main parser would then choose the encoding of the subparser which yields the highest confidence level value. The subparser which returns the highest confidence level value desirably returns the encoding with the largest size for that instruction.

Attributes of the speculative result (e.g. field sizes of data structures used in the source code) can be encoded in the confidence level to assist selector 300 in selecting a parsing tree which is used for further compiling. Thus, for example, if an attribute such as data structure field sizes is transmitted to selector 300, selector 300 can use this information to choose a result corresponding to a parsing tree with a corresponding maximum field size of all of the results corresponding to generated parsing trees (or portions thereof). Other attributes may also be used, such as the size of overflow errors.

Mathematical errors in the context of constant definition is another example of how confidence level may be decreased. For example, the definition of a constant 9/0 is a mathematical error.

Figure 3:
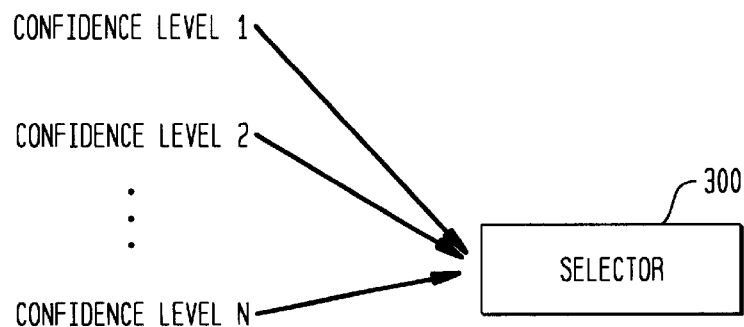
FIG. 3 is a block diagram which illustrates the receipt of confidence levels by the selector in accordance with an exemplary embodiment of the present invention.

In one exemplary embodiment of the present invention, all of subparsers 200a–200n which are available to main parser unit 100 generate respective speculative results. The speculative result with a confidence level indicating successful parsing is the parsing tree used for further compiling. As shown in FIG. 3, the confidence level value generated by each subparser 200a–200n is received by selector 300. Selector 300 is then capable of selecting the speculative result which corresponds to the confidence level value indicating successful parsing.

In an alternative embodiment of the present invention, a mechanism is provided for the situation where none of the confidence levels indicate that any of subparsers 200a–200n has completed a truly successful parse. In this embodiment, selector 300 may select the speculative result corresponding to the highest confidence level generated by all of the invoked subparsers from subparsers 200a–200n or, alternatively, any speculative results in which the confidence level value is above a predetermined value. The alternative approach may be useful to provide the programmer with multiple possible error codes corresponding to the error which has been detected. In either case, the programmer is provided with at least one result which is as close as possible to a result corresponding to a totally correct parse tree from all of the parsing tables which have been applied to the statement by their respective subparsers.

If two or more subparsers indicate the same confidence level (which is the highest confidence level generated from all of the subparsers), and if no subparser indicates complete success, this indicates an error. Selector 300 can be programmed to choose the result from the first subparser that generated this confidence level, from the subparser that processed the greatest number of tokens before the error occurred, etc.

In an alternative embodiment of the present invention, each of subparsers 200a–200n shown in FIG. 2 are invoked until either a) a confidence level indicating a completely successful parse is obtained or, b) a confidence level above a predetermined level (indicating at least a minimal level of success in the parse) is obtained. In these embodiments, main parser unit 100 desirably decides the order in which subparsers 200a–200n are to be invoked in order to parse the statement. One technique which is certainly available is for subparsers 200a–200n to be invoked simply in a random order. Another technique which is available is for subparsers 200a–200n to be invoked in a predetermined order. This predetermined order may be based, for example, upon the complexity of the parse attempted by each subparser 200a–200n. Thus, for example, the programmer may be aware that one subparser (e.g., subparser 200a) uses a relatively simple parsing table in order to parse the statement. Another subparser (e.g., subparser 200b) may use a relatively complicated parsing table in order to parse the statement. Thus, the programmer can decide to have subparsers 200a–200n invoked in order of increasing complexity of their respective parsing tables. This determination by the programmer can be, for example, a completely subjective determination. Thus, the programmer can arrange for the subparsers to be invoked in increasing levels of complexity based merely upon his/her own personal experience. Alternatively, the invocation of subparsers 200a–200n in increasing levels of complexity can be based upon objective knowledge of the size or complexity of their respective parsing tables.

Alternatively, other criteria may be used to arrange the order in which subparsers 200a–200n are invoked until a satisfactory confidence level is obtained. For example, invocation of subparsers 200a–200n can be arranged based on size (of, for example, target instructions or result corresponding to parse tree), execution speed of target instructions, or complexity of the speculative results. Again, this ordering can be based upon subjective knowledge, objective knowledge, or a combination of the two.

To assist the main parser unit in invoking the subparsers in a predetermined order, an optional program interface 150 is included. This is illustrated in FIG. 1. The program interface may include or be coupled to a program interface table 180 which indicates the order in which subparsers 200a–200n are to be invoked. This may provide a significant amount of flexibility to the programmer. Thus, if the programmer wishes to vary the order in which subparsers 200a–200n are invoked, this variation can be accomplished dynamically. The programmer may simply modify the order in which subparsers are listed in the program interface for invocation. Using programmer interface 150, it is also possible to add or remove the invocation of subparsers by simply adding or removing calls to subparsers from the program interface table 180.

Program interface 150 may also include other optional capabilities. Using program interface table 180 which is resident in program interface 150 or by specifying a file containing program interface table 180 into program interface 150, a plurality of directives can be provided to call certain subparsers responsive to the identification of certain instructions in the source code. A keyword list (for conversion of source code instructions into tokens) may also be included in (or coupled to) program interface 150. This keyword list may be fed into main parser unit 100 and back to the lexical analyzer to adjust the lexical analyzer's keyword list. This keyword list may also include additional (optional) keywords which may be used as parsing directives.

Figure 4:
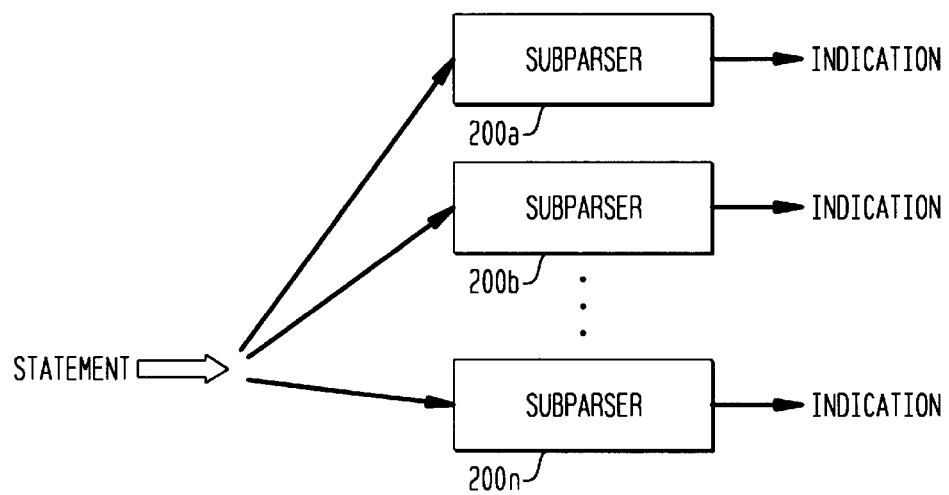
FIG. 4 is a block diagram of an alternative embodiment of the present invention in which the receipt of a statement by multiple subparsers is illustrated.

An alternative embodiment of the present invention is shown in FIG. 4. In FIG. 4, the statement is transmitted from main parser unit 100 to one or more of the subparsers 200a–200n. As each subparser 200a–200n is invoked, each subparser 200a–200n provides an indication of whether it has parsed the statement successfully. A result corresponding to a parse tree is then obtained from the subparser which has indicated the most successful parsing of the statement.

Figure 5:
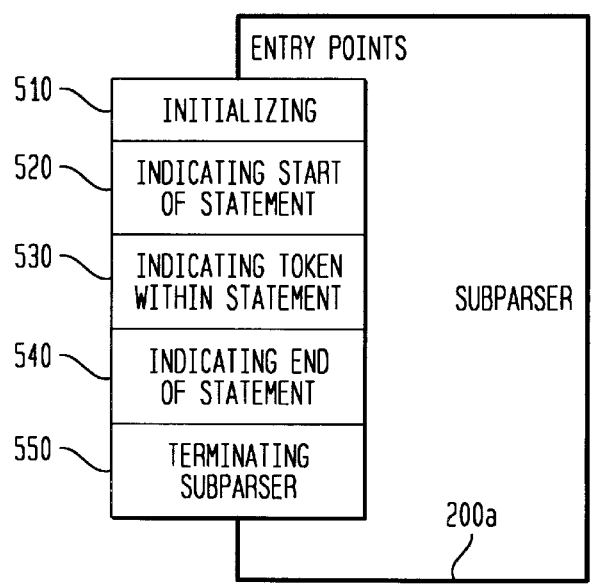
FIG. 5 is a block diagram which illustrates the entry points to a subparser in accordance with an exemplary embodiment of the present invention.

In this embodiment, each of the subparsers has an identical interface to main parser unit 100. Main parser unit 100 passes tokens to subparsers 200a–200n. Again, each subparser is called in the order specified until one indicates that it has successfully interpreted the token stream (or statement) or all have been called (in which case the "most successful" result is used). In this embodiment, the primary responsibility of main parser unit 100 is to provide input to subparsers 200a–200n. Thus, the following entry points are provided by each subparser as illustrated in FIG. 5.

Entry point 510 is for initializing the subparser to be invoked (if needed). Thus, for example, by accessing this entry point, the subparser's state machine is reset, internal stacks are cleared, global variables are provided to the subparser, etc. Entry point 520 is for indicating the start of a statement (if the tokens are easily divided into statements). Entry point 530 is for indicating a token within a statement. Entry point 540 is for indicating the end of statement (if the tokens are easily divided into statements). Entry point 550 is for terminating the subparser (if needed). By accessing these entry points, the subparser can be initialized, the start and end of a statement can be indicated, and tokens can be received.

By using the present invention, tools that require parsers can be rapidly configurable to recognize entirely different forms of input (e.g., a different assembly language). They can be user-configurable, even user-programmable.

Subparsers can be implemented as separate programs or dynamically-linked libraries, which can be used, for example, to save memory (by not loading all of them). It is also possible to remove unneeded subparsers for security reasons or to save disk space.

Development time can also be much faster. Not only does the present invention allow parsers to be designed in a top-down manner (which is likely to be the way the input format is documented), but it makes it easier for multiple developers to design different parts of one tool at the same time. If the subparsers call each other, code reusability is improved as well.

A further exemplary embodiment of the present invention is illustrated in FIG. 6. In accordance with FIG. 6, a single re-entrant parser with multiple entry points is used in place of a traditional monolithic single parser. Speculative parsing is used, enabling each entry point to act as an independent parser which need not be aware of the other entry points. Each entry point need only attempt to decode its input, reporting a confidence level as well as speculative results. For each statement in the input data, multiple entry points are invoked which independently attempt to decode the respective statement. Furthermore, a production can be accessed from more than one entry point and is hence reusable.

Figure 6A:
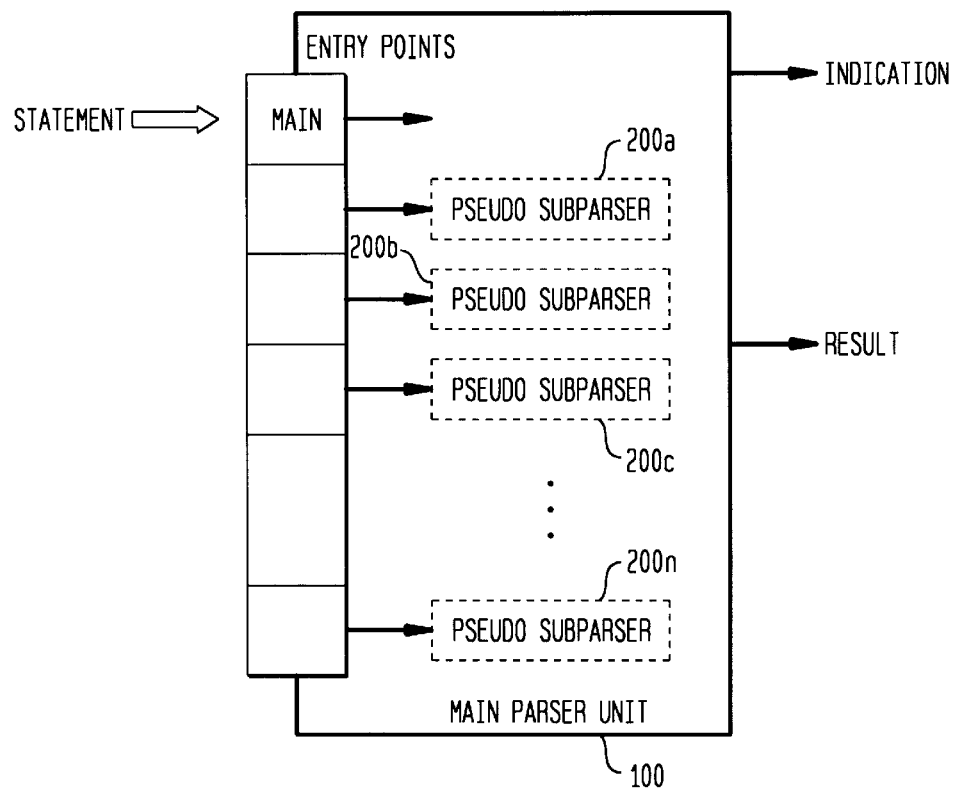
FIG. 6(a), 6(b) and 6(c) are block diagrams of an alternative embodiment of the present invention illustrating the parsing of a statement by using multiple entry points of a re-entrant parser.
Figure 6B:
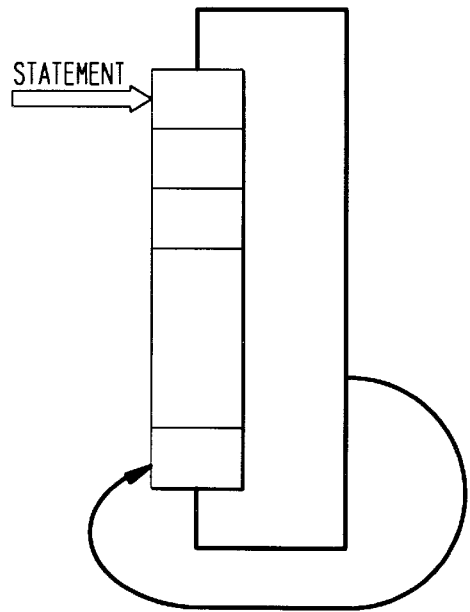
Figure 6C:
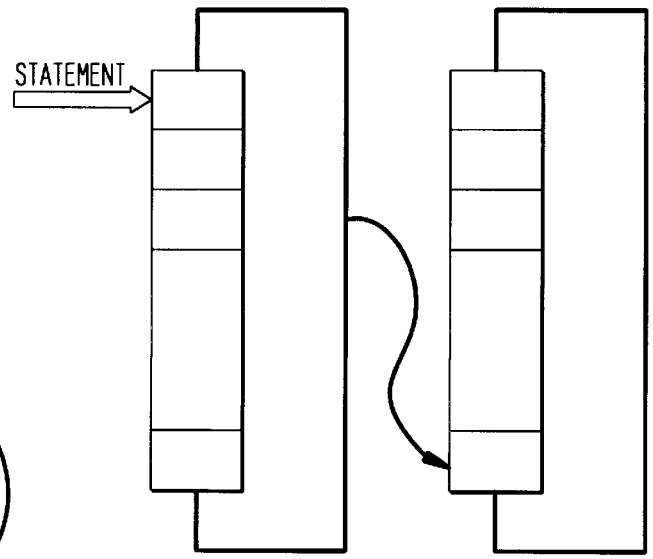

Thus, in this embodiment, there are not necessarily a plurality of separate subparsers. Rather, there may be one parser behaving like (or emulating) separate subparsers. Each emulated subparser will be referred to as a pseudo subparser. As shown in FIG. 6(a), each of the pseudo subparsers is invoked by a respective entry point associated with a single parser. Otherwise invoking each of the pseudo subparsers may be a reinvocation of main parser unit 100. This reinvocation may be accomplished through recursion (FIG. 6(b)), or alternatively, by creating a copy of the main parser which may be restarted at each of the entry points (FIG. 6(c)). Thus, main parser unit 100 transmits the statement to the appropriate entry point and the pseudo subparser corresponding to that entry point is invoked. As in the previous embodiments, the statement can be handed to different entry points in a predetermined order.

In an exemplary embodiment based upon re-entrant subparsing, a table, as shown in FIG. 7, may be desirable. In this table, as each statement is handed to an entry point, the entry point which receives the statement is recorded in the table.

Each time a statement is parsed, a global state for the source code being parsed is retained by main parser unit 100. The global state, includes, for example, the correct (or most desirable) parsing tree which has been generated (so far) for the computer program being parsed. Thus, the global state is received at each of the entry points which are called by main parser unit 100 and the respective pseudo subparser is invoked. Each pseudo subparser makes a copy of the global state which it receives. The copy of the global state is referred to the local state. Each pseudo subparser makes modifications to its respective local state until it has generated as much of a result corresponding to a parsing tree as it can. The pseudo subparser which is selected as providing the successful (or most successful) parse of the statement provides its local state to update the global state stored in main parser unit 100. Thus, the local state of each pseudo subparser is retained until the pseudo subparser with the speculative result having the "best" confidence level is selected. The local state of that pseudo subparser is then used to update the global state stored in main parser unit 100.

By having each pseudo subparser modify only its respective local state, the integrity of the program state across pseudo subparsers is maintained. Thus, the chosen parse is the only parse which updates the global state. In this manner, the global state will not be corrupted by unsuccessful (or other than the most successful) subparses.

Each of the aforementioned confidence level attributes may be calculated in each pseudo subparser. If a re-entrant scheme is used, then some of the data can be shared between pseudo subparsers. This data can be passed into each pseudo subparser or it can be maintained globally for use by all pseudo subparsers.

Figure 8B:
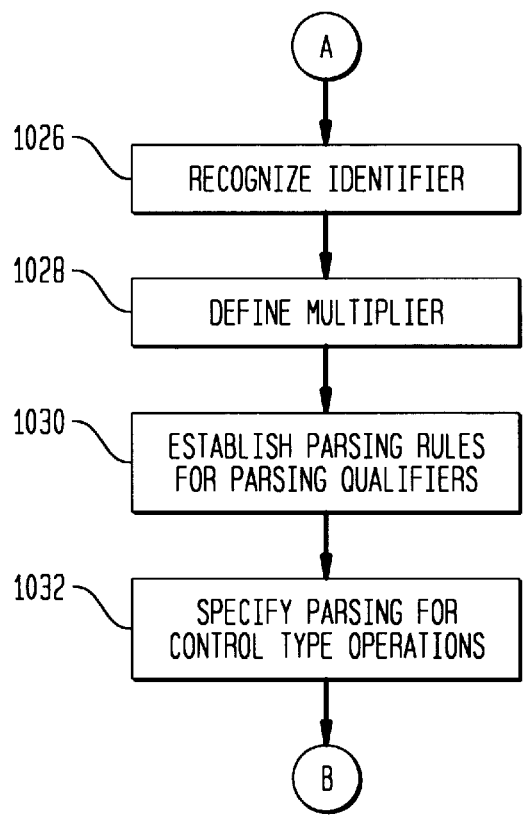
Figure 8C:
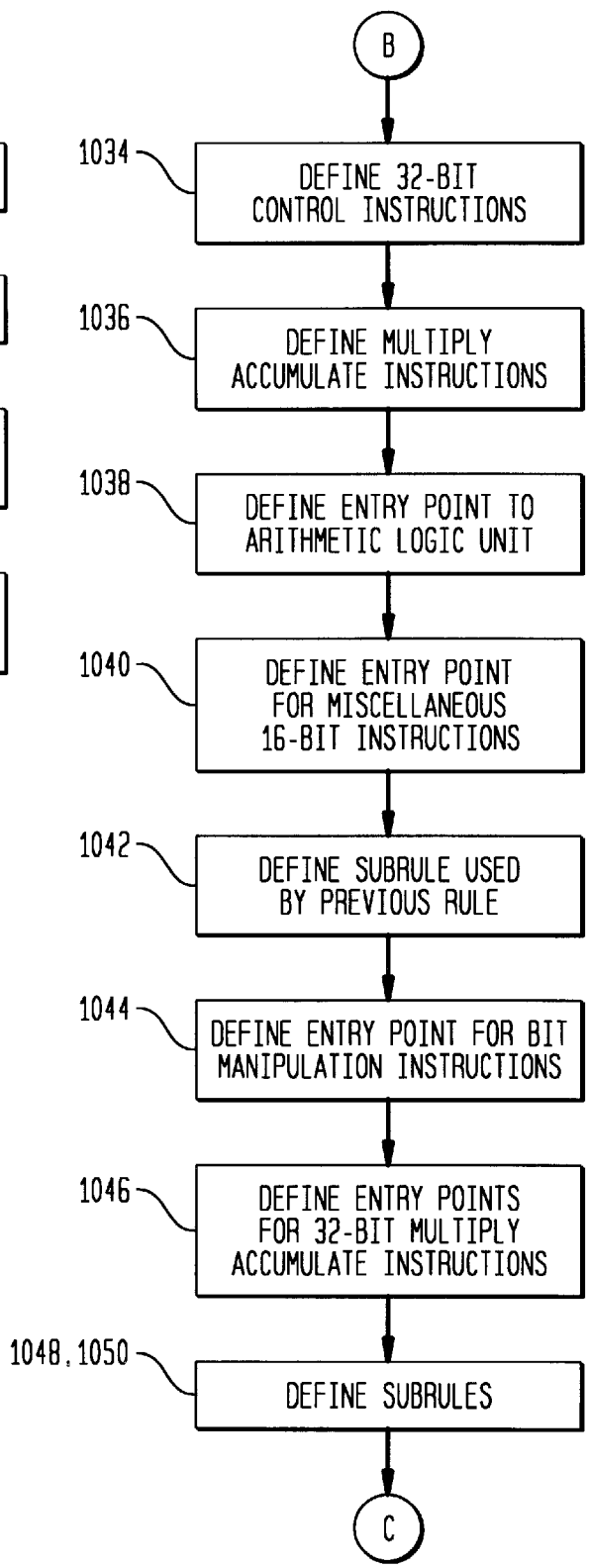

In an exemplary embodiment of the present invention, processing is conducted in accordance with the flowcharts which appear in FIGS. 8(*a*)–8(*d*).

At step 1012, the interface between the lexical analyzer and the main parser unit is defined. At step 1014, a plurality of entry points are defined. Each entry point represents a complete statement and corresponds to a respective production (i.e., parsing rule). For example, a parsing rule may correspond to an instruction type for a particular size instruction. At step 1016, a plurality of qualifiers are identified. Each qualifier aids the main parser in selecting an appropriate entry point. The identification of qualifiers is optional.

At step 1018, union data structures are defined. The union data structures enable data to be transferred between different productions. At step 1020, the entry point for the main parser unit is identified. At step 1022, the entry points for the pseudo subparsers are identified. At step 1024, the main parser unit is defined.

Processing proceeds to step 1026 via offpage connector A. At step 1026, an identifier is recognized by the main parser unit. The main parser unit assigns an address to the recognized identifier. The identifier may also be recognized by a pseudo subparser if it is used elsewhere. An identifier may be, for example, a target of a branch instruction.

At step 1028, a multiplier is defined. The multiplier optionally enables a statement to be copied (i.e., duplicated).

At step 1030, the appropriate production (or parsing rules) are established for parsing qualifiers. At step 1032, parsing for control type operations is specified. Control type operations, generically speaking, may be, for example, GOTO, RETURN, CALL, etc. Step 1032 contemplates the use of constants for specifying field values which may be used by control statements. The constant may be, for example, a pointer to a label name (previously defined).

Processing proceeds to step 1034 via offpage connector B. At step 1034, 32-bit control instructions may be defined. 32-bit control instructions may be similar to 16-bit control instructions except, of course, for the size of the instruction. At step 1036, multiply accumulate instructions may be defined. Again, for clarification, this is an entry point to a pseudo subparser. Additional parsing rules may be used to support the multiply accumulate entry point.

At step 1038, the entry point to arithmetic logic unit (16-bit) entry point operations is defined.

At step 1040, the entry point for miscellaneous 16-bit instructions is defined. At step 1042, the subrule used by the rule defined at step 1040 is itself defined. At step 1044, the entry point for bit manipulation instructions is defined. At step 1046, the entry points for 32-bit multiply accumulated instructions is defined. In an exemplary embodiment of the present invention, two separate entry points for parsing 32-bit multiply accumulate instructions are defined. This may be done, for example, if the 32-bit multiply accumulate instructions are too complicated for a single subparser to handle. Also, in a preferred embodiment of the present invention, both 32-bit multiply accumulate instructions are invoked. Each 32-bit multiply accumulate instruction parses the statement differently. The reason that the two pseudo subparsers parse the statement differently is because each represents a different possible manner in which the statement may be parsed. Thus, there are two alternative parsing strategies (or productions) provided for parsing the 32-bit multiply accumulate instructions. The pseudo subparser which is the proper parser for parsing the particular 32-bit multiply accumulate instruction which is received desirably produces the speculative result with the higher confidence level.

In an exemplary embodiment of the present invention, each separate 32-bit entry point for the 32-bit multiply accumulate instructions may share a subproduction (or more than one subproduction). Thus, at steps 1048 and 1050, subproductions used by the two separate 32-bit multiply accumulate instruction entry points are defined, while, at step 1052, a subproduction which may be used by both 32-bit multiply accumulate entry points may be defined. Processing proceeds to step 1052 via offpage connector C.

At step 1054, a plurality of subproductions which may be used by many of the previously defined pseudo subparsers are themselves defined. These subrules may represent, for example, a memory reference to a register, a set of direct register references, constant (or expression) definition, reference to an identifier (or a label), etc. Also, in a preferred embodiment of the present invention, the subproductions define that at step 1054 may also be used by the main parser unit.

At step 1056, all of the tokens which are candidates for use in an instruction may be used. Furthermore, at step 1058, the tokens which are preferably for use in the initial location of an instruction are defined.

Operation of main parser unit 100 is illustrated in FIG. 8(*e*). At step 1001 main parser unit 100 recognizes a statement. At step 1002, the main parser unit calls those pseudo subparsers which it knows are the correct pseudo subparsers to call to parse a particular statement. If the main parser unit does not know which pseudo subparser to call, by default, it calls all pseudo subparsers available. Alternatively, if the main parser unit has been given (e.g., by the programmer) additional coding to assist in the determination of which pseudo subparser to call, the main parser unit calls zero or more particular pseudo subparsers in accordance with the additional program code for which it has been supplied. Thus, in an alternative embodiment of the present invention, the programmer may insert additional instructions in the source code to indicate which subparser (or pseudo subparser) the programmer desires to have used to parse a statement. Main parser unit 100 is provided these additional instructions so it may select the desired subparser (or pseudo subparser). At step 1003, the main parser unit calls the pseudo subparsers until they have all been called or until a successful parse is obtained. If one of the pseudo subparsers provides a completely successful result, no additional pseudo subparsers need be called. The result of a parse performed by a pseudo subparser is only used if it is better than the previous "best" result performed by other pseudo subparsers. At step 1004, the calling of pseudo subparsers is completed. At step 1005, the main parser unit uses the pseudo subparser result which is the best result of all pseudo subparser results obtained. Alternatively, at step 1006, main parser unit 100 reports an appropriate error code. If at step 1007 there are more statements then control shifts to step 1001 where main parser unit 100 recognizes another statement. Otherwise, at step 1008, processing is completed.

The above description is with regard to a re-entrant parser. If separate parsers instead were used as subparsers, one of ordinary skill in the art would recognize that the use of separate entry points to respective productions would not be required.

In a preferred embodiment of the present invention, LR(1) parsing is used. A description of LR(1) parsing is fully described in Aho, A. et al., Compilers, Principles, Techniques, and Tool, Addison-Wesley, 1986, pages 40–48. It will be understood to one of ordinary skill in the art that other types of parsing schemes may be used. Alternative exemplary parsing schemes which may be used may be, for example, LALR, LL, LR, etc.

In an alternative embodiment of the present invention, LALR parsing may be used. By using LALR parsing, the existence of conflicts in the statements which are passing through the main parsing unit to the subparsers is eliminated. This may result in the advantage that errors in grammar may be detected before any subparser is invoked. Thus, the error would be detected during the grammar generation stage which occurs in the main parser unit but before compilation. In other words, the errors are being determined at the subparser generation stage.

Figure 9:
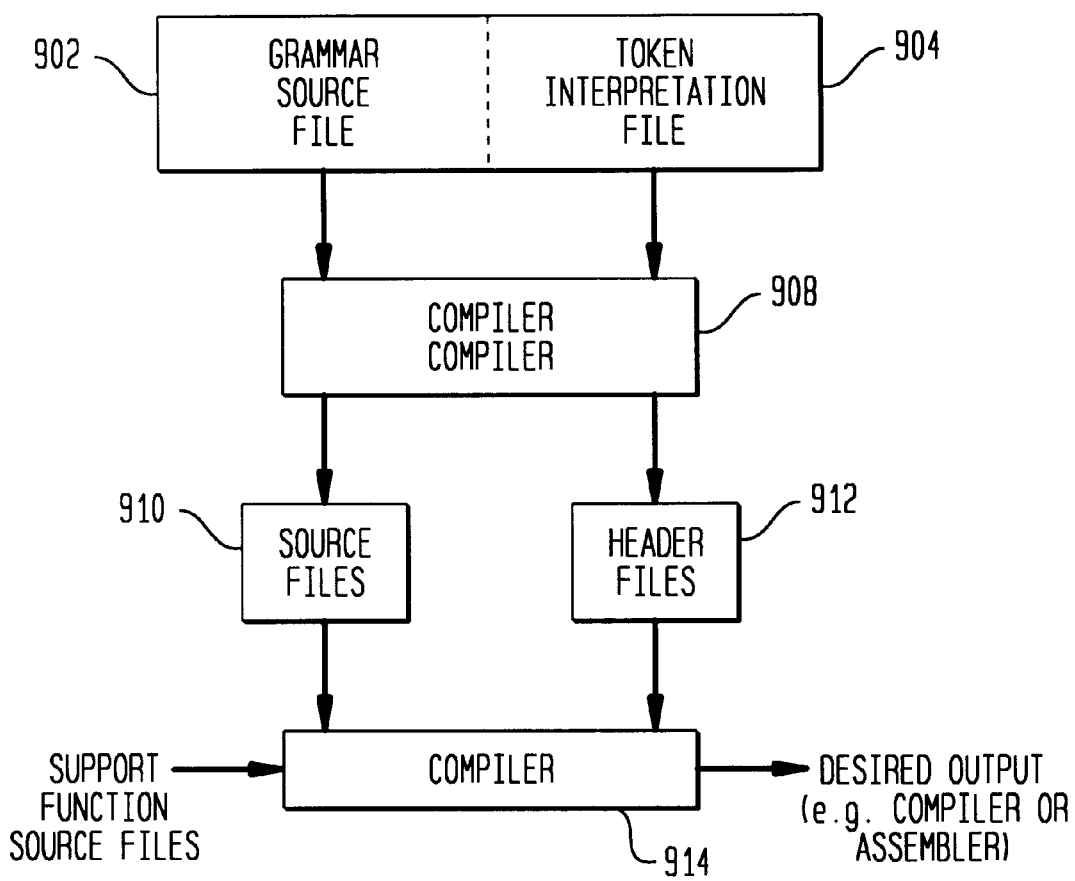
FIG. 9 is a block diagram which illustrates the formation and use of a compiler in accordance with an exemplary embodiment of the present invention.

The generation of subparsers or pseudo subparsers is accomplished as follows. Referring to FIG. 9, a grammar source file 902 is provided. In addition, a lexical analyzer token interpretation file 904 is also provided. These files may be combined into a single file to facilitate handling. Files 902,904 are used as the input to a compiler compiler 908. An exemplary compiler compiler is YACC$^{++}$ which is produced by Compiler Resources Inc.. YACC$^{++}$ can generate either a plurality of individual monolithic parsers to each behave as subparsers, or a single parser which behaves as subparsers (described above as pseudo subparsers) by using multiple entry points. Either parser generation is described in YACC$^{++}$ and the Language Objects Library Tutorial Guide, June 1995 which is published by Compiler Resources, Inc., Hopkinton, Mass. and which is incorporated herein by reference.

Compiler compiler 908 generates, as its output, source and header files 910,912. The use of a compiler compiler to generate source and header files is known to one of ordinary skill in the art. The output of YACC$^{++}$ may be combined with user written source files which serve support functions. These support files may include information such as, for example, error reporting, print formatting, etc. Each of these files are then compiled by compiler (e.g. a C compiler) 914 to produce the desire output (for example a compiler or an assembler). The user may then use the desired output in conjunction with user generated source code to generate object code as desired.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A parser comprising:
    a plurality of subparsers, each for attempting to interpret a stream of tokens corresponding to a statement in a respectively different way and for returning a respective speculative result and a respective confidence level;
    a main parser unit for receiving said stream of tokens, for identifying said stream of tokens as said statement and for invoking ones of said plurality of subparsers; and
    a selector for selecting said respective speculative result based upon each confidence level, returned by said ones of said plurality of subparsers which are invoked, being at a predetermined level.

2. A parser according to claim 1, wherein said predetermined level is total success interpreting said stream of tokens.

3. A parser comprising:
    a plurality of subparsers, each for attempting to interpret a stream of tokens corresponding to a statement in a respectively different way and for returning a respective speculative result and respective confidence level;
    a main parser unit for receiving said stream of tokens, for identifying said stream of tokens as said statement and for invoking ones of said plurality of subparsers; and
    a selector for selecting said respective speculative result based upon each confidence level, returned by said ones of said plurality of subparsers which are invoked, being above a predetermined level.

4. A parser comprising:
    a plurality of subparsers, each for attempting to interpret a stream of tokens corresponding to a statement in a respectively different way and for returning a respective speculative result and a respective confidence level;
    a main parser unit for receiving said stream of tokens, for identifying said stream of tokens as said statement and for invoking ones of said plurality of subparsers; and
    a selector for selecting said respective speculative result based upon each confidence level, returned by said ones of said plurality of subparsers which are invoked, being higher than other respective confidence levels returned by other of said parsers.

5. A parser comprising:
    a plurality of subparsers, each for attempting to interpret a stream of tokens corresponding to a statement in a respectively different way and for returning a respective speculative result and a respective confidence level;
    a main parser unit for receiving said stream of tokens, for identifying said stream of tokens as said statement and for invoking ones of said plurality of subparsers wherein, said ones of said plurality of subparsers are invoked in a predetermined order; and
    a selector for selecting said respective speculative result based upon each confidence level returned by said ones of said plurality of subparsers.

6. A parser according to claim 5, wherein said predetermined order is based upon complexity of each interpretation attempted for said stream of tokens.

7. A parser according to claim 5, wherein said predetermined order is based upon execution speed of each interpretation attempted for said stream of tokens.

8. A parser comprising:

a plurality of subparsers, each for attempting to interpret a stream of tokens corresponding to a statement in a respectively different way and for returning a respective speculative result and a respective confidence level;

a main parser unit for receiving said stream of tokens, for identifying said stream of tokens as said statement and for invoking ones of said plurality of subparsers wherein, said ones of said plurality of subparsers are invoked concurrently; and a selector for selecting said respective speculative result based upon each confidence level returned by said ones of said plurality of subparsers which are invoked.

9. A method of parsing a stream of tokens corresponding to a statement, comprising the steps of:

receiving said stream of tokens and identifying said stream of tokens as said statement;

invoking a plurality of subparsers to attempt to interpret said stream of tokens, wherein each of said subparsers generates a respective speculative result and a respective confidence level; and selecting one of said speculative results from said plurality of subparsers based upon said respective confidence level, generated by each of said subparsers, being at a predetermined level.

10. A method of parsing a stream of tokens according to claim 9, wherein said predetermined level is total success interpreting said stream of tokens.

11. A method of parsing a stream of tokens corresponding to a statement, comprising the steps of:

receiving said stream of tokens and identifying said stream of tokens as said statement;

invoking a plurality of subparsers to attempt to interpret said stream of tokens, wherein each of said subparsers generates a respective speculative result and a respective confidence level; and selecting one of said speculative results from said plurality of subparsers based upon said respective confidence level, generated by each of said subparsers, being above a predetermined level.

12. A method of parsing a stream of tokens corresponding to a statement, comprising the steps of:

receiving said stream of tokens and identifying said stream of tokens as said statement;

invoking a plurality of subparsers to attempt to interpret said stream of tokens, wherein each of said subparsers generates a respective speculative result and a respective confidence level; and selecting one of said speculative results from said plurality of subparsers based upon said respective confidence level, generated by each of said subparsers, being higher than other respective confidence levels returned by other of said parsers.

13. A method of parsing a stream of tokens corresponding to a statement, comprising the steps of:

receiving said stream of tokens and identifying said stream of tokens as said statement;

invoking a plurality of subparsers to attempt to interpret said stream of tokens wherein, said ones of said plurality of parsers are invoked in a predetermined order, wherein each of said subparsers generates a respective speculative result and a respective confidence level; and selecting one of said speculative results from said plurality of subparsers based upon said respective confidence level, generated by each of said subparsers.

14. A method of parsing a stream of tokens according to claim 13, wherein said predetermined order is based upon complexity of each interpretation attempted for said stream of tokens.

15. A method of parsing a stream of tokens according to claim 13, wherein said predetermined order is based upon execution speed of each interpretation attempted for said stream of tokens.

16. A method of parsing a stream of tokens, comprising:

receiving said stream of tokens and identifying said stream of tokens as said statement;

invoking a plurality of subparsers to attempt to interpret said stream of tokens wherein, ones of said subparsers are invoked concurrently, wherein each of said subparsers generates a respective speculative result and a respective confidence level; and selecting one of said speculative results from said plurality of subparsers based upon said respective confidence level, generated by each of said subparsers.

\* \* \* \* \*